United States Patent [19]

Olexa, Jr.

[11] Patent Number: 5,778,720
[45] Date of Patent: Jul. 14, 1998

[54] PUNCH-OUT REMOVING TOOL

[76] Inventor: Bruce T. Olexa, Jr., 181 Briarwood Dr., Erma, N.J. 08204

[21] Appl. No.: 803,817

[22] Filed: Feb. 24, 1997

[51] Int. Cl.[6] .................................................. B23P 19/04
[52] U.S. Cl. .................. 72/325; 72/479; 29/267; 29/270
[58] Field of Search .................. 72/479, 458, 480, 72/325; 29/267, 270; 30/429, 359

[56] References Cited

U.S. PATENT DOCUMENTS

| 2,844,060 | 7/1958 | Hagerty | 72/479 |
| 2,852,971 | 9/1958 | Macaluso | 72/458 |
| 2,957,376 | 10/1960 | Parisi | 72/458 |
| 3,105,299 | 10/1963 | Wirtanen | 30/360 |
| 3,564,715 | 2/1971 | Burrows | 30/360 |
| 3,579,797 | 5/1971 | Pepe | 29/267 |
| 3,678,561 | 7/1972 | Mautz | 29/267 |
| 3,736,643 | 6/1973 | Pepe | 29/267 |
| 4,189,964 | 2/1980 | Gray | 81/3 |
| 4,509,242 | 4/1985 | Marra | 29/267 |
| 4,922,615 | 5/1990 | Nishida | 30/360 |

FOREIGN PATENT DOCUMENTS 662232  5/1979  U.S.S.R. .................... 29/267

Primary Examiner—Daniel C. Crane
Attorney, Agent, or Firm—Norman E. Lehrer

[57] ABSTRACT

A tool for prying open punch-outs from an electrical box. The tool includes a handle member, an elongated shaft which extends outwardly from the handle member and terminates in a bent tip, and a slide assembly mounted to said elongated shaft. The slide assembly is adapted to engage a lip which extends perpendicularly from a wall of the box. The bent tip of the elongated shaft is adapted to act as a cam in order to pry open a punch-out from the box when the slide assembly engages the perpendicularly extending lip and the handle is rotated.

2 Claims, 2 Drawing Sheets

U.S. Patent  Jul. 14, 1998  Sheet 1 of 2  5,778,720
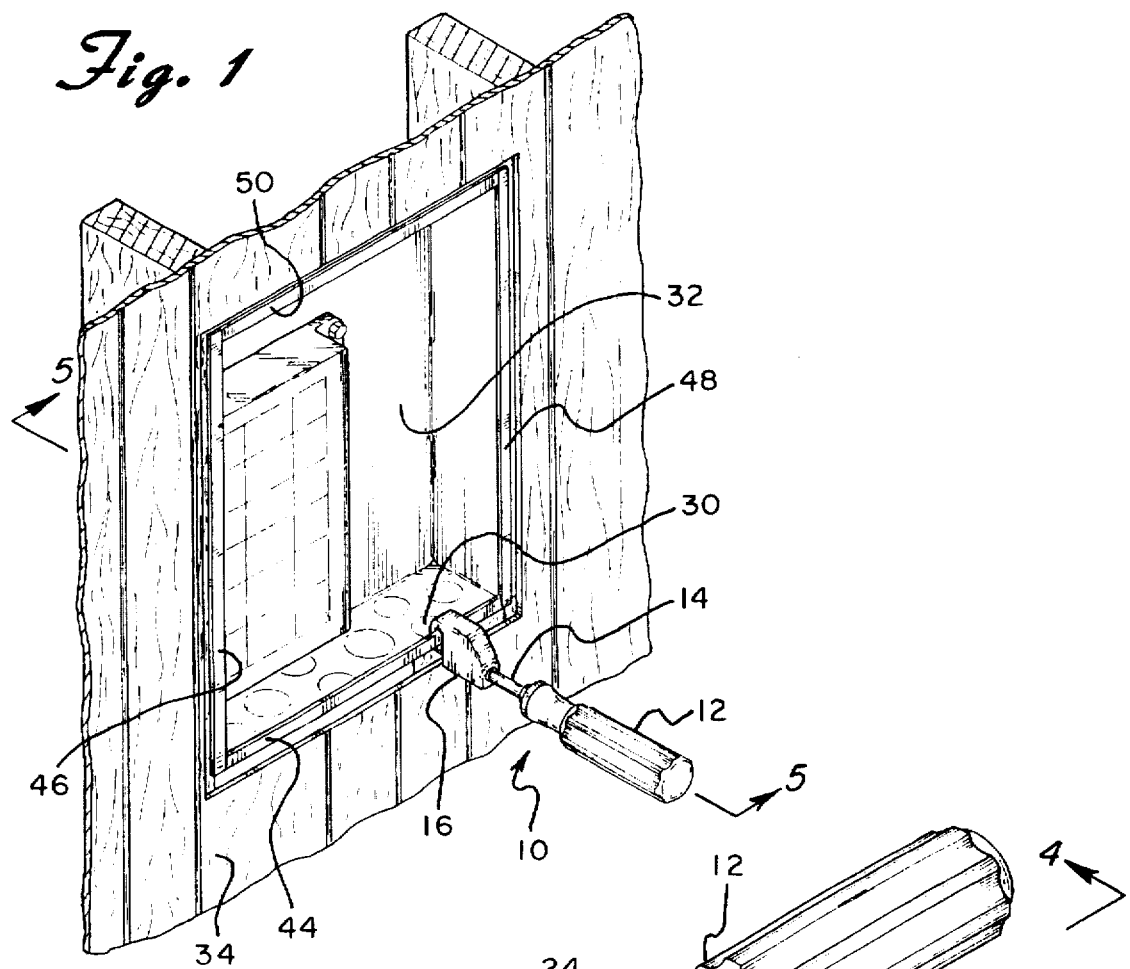
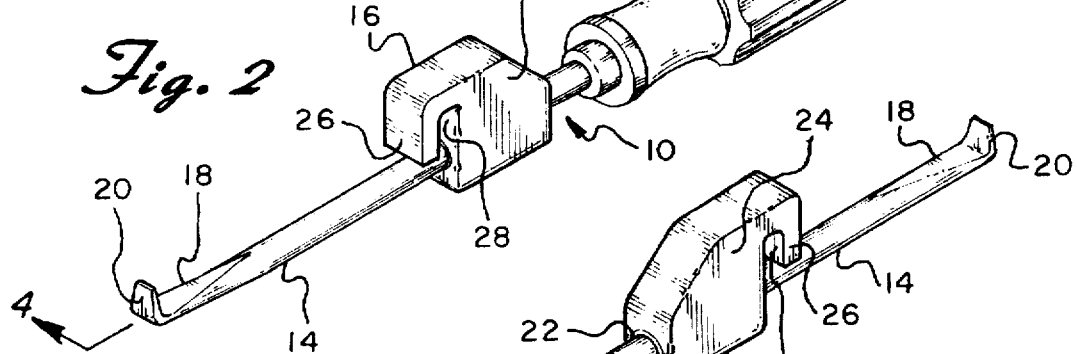
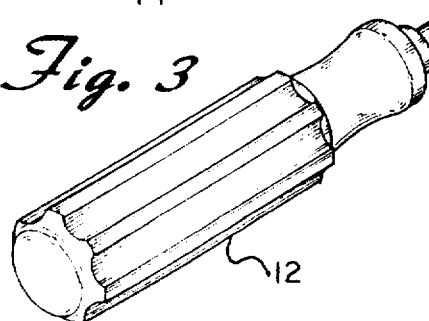

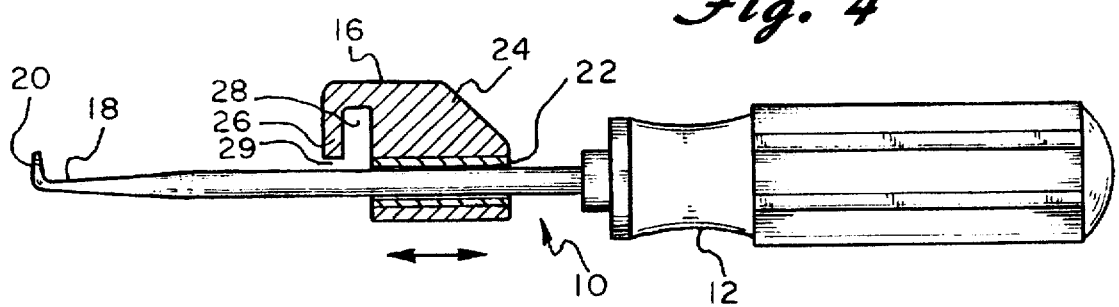
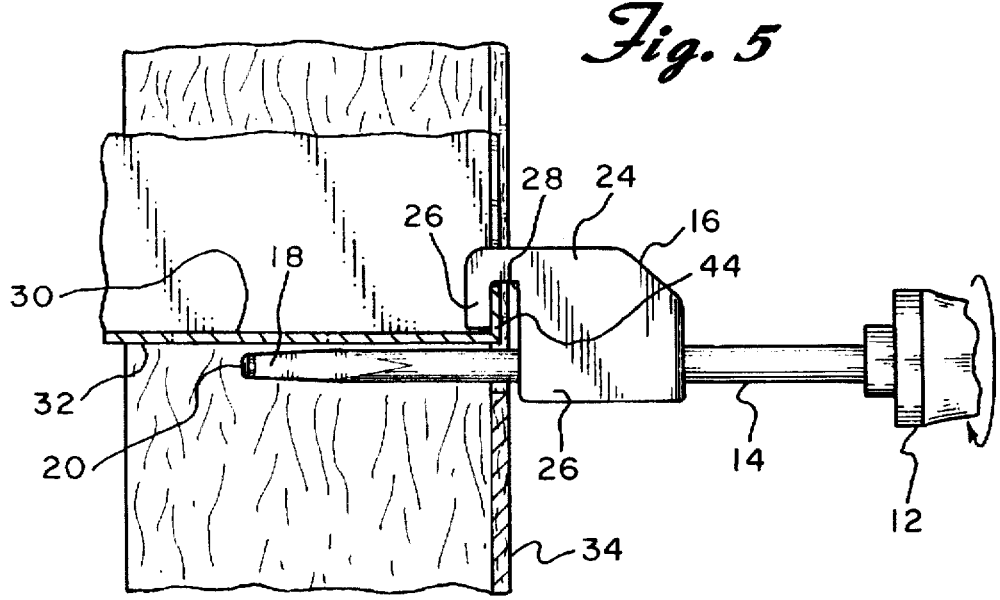
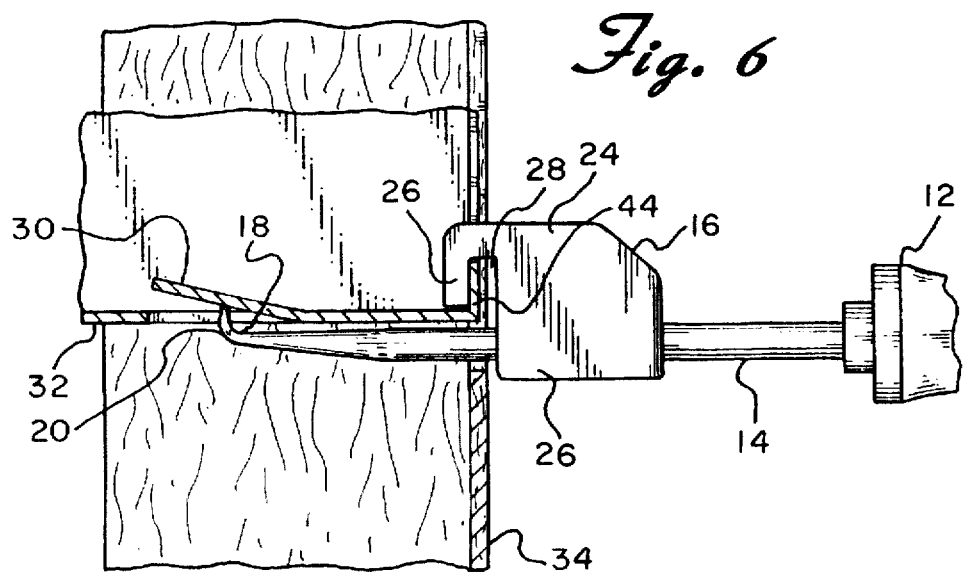

5,778,720

1

PUNCH-OUT REMOVING TOOL

BACKGROUND OF THE INVENTION

The present invention is directed toward a punch-out removing tool and, more particularly, to such a tool which is adapted to pry open inaccessible punch-outs from a circuit breaker box or the like.

Electrical wires, which are run through a building, usually have one end secured within a metal box-like enclosure such as a circuit breaker box, fuse box, electrical meter box or the like. The ends of these wires are secured to utility or control components located within the box-like enclosure.

A typical box-like enclosure is formed out of relatively rigid sheet material and has a plurality of openings therein which are initially closed by removable concentric punch-outs. The punch-outs are typically pre-punched through the majority of their circumference in order to facilitate the removal thereof upon the application of a predetermined level of pressure. The punch-outs arc removed when it is necessary to provide access to the inside of the enclosure for wires which must enter or exit the same.

Box-like enclosures of the type described above are often mounted adjacent a wall or other vertical surface. In order to remove each punch-out, pressure is applied to one side of the same until the punch-out partially extends from the surface of the enclosure. Thereafter, the punch-out is grasped with a pair of pliers, side cutters or the like and manually bent back and forth until it is completely fractured from the box-like enclosure. One method of applying pressure to each of the punch-outs includes placing a blunt instrument on the punch-out and then striking the same with a hammer until the punch-out is sufficiently fractured from the box-like enclosure. This procedure is awkward to carry out and requires the use of several tools.

In recognition of the foregoing, tools have been developed for facilitating the removal of punch-outs from box-like enclosures. U.S. Pat. Nos. 3,579,797, 3,763,643, and 4,189,964 describe examples of such tools. While each of the tools disclosed in these patents may be useful in removing punch-outs which are readily accessible, they are not effective in removing punch-outs which are hard to reach.

For example, in many cases, the box-like enclosures are mounted flush with a wall so that only a minimal amount of space exists between the box-like enclosure and the wall. Since the punch-outs are preformed to be bent only into the interior of the box-like enclosure, pressure must be applied from the outside. However, existing punch-out removing tools are not sized to be inserted into the small space between the enclosure and the wall in order to bend the punch-outs to be removed into the interior of the enclosure.

SUMMARY OF THE INVENTION

The present invention is designed to overcome the deficiencies of the prior art discussed above. It is an object of this invention to provide a tool for prying open punch-outs located in hard to reach areas in box-like enclosures which are mounted flush with a wall.

It is a further object of the invention to provide such a tool which is adapted to reach punch-outs located at varying distances from the wall.

It is yet another object of the invention to provide a tool which can pry open such punch-outs without damaging the adjacent wall.

In accordance with the illustrative embodiments, demonstrating features and advantages of the present invention, there is provided a tool for prying open punch-outs from sheet metal electrical boxes. The tool includes a handle member, an elongated shaft, which extends outwardly from the handle member and terminates in a bent tip, and a slide assembly mounted to the elongated shaft. The slide assembly is adapted to engage an elongated lip, which extends perpendicularly from a wall of the box. The bent tip of the elongated shaft is adapted to act as a cam in order to pry open a punch-out from the box when the slide assembly engages the perpendicularly extending lip.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of a punch-out removing tool shown in use in conjunction with a circuit breaker box;

FIG. 2 is a front perspective view of the punch-out removing tool;

FIG. 3 is a rear perspective view of the punch-out removing tool;

FIG. 4 is a partial cross-sectional view taken along lines 4—4 of FIG. 2;

FIG. 5 is a partial side plan view of the punch-out removing tool taken along lines 5—5 of FIG. 1, and FIG. 6 is a view similar to FIG. 5 and showing the punch-out removing tool prying open a punch-out from the circuit breaker box.

DETAILED DESCRIPTION OF THE PREFERRED EMBODIMENT

Referring now to the drawings in detail wherein like reference numerals have been used throughout the various figures to designate like elements, there is shown in the figures a punch-out removing tool constructed in accordance with the principles of the present invention and designated generally as 10.

The tool 10 essentially includes a handle member 12, an elongated shaft 14, which extends outwardly from the handle member, and a slide assembly 16 mounted to the elongated shaft 14. The handle member 12 is preferably in the form of a conventional screw driver handle and is comprised of heavy duty plastic. Further, the handle member 12 is preferably approximately 4" long and has a maximum diameter of approximately 1⅜".

In the preferred embodiment, the elongated shaft 14 is approximately 7" long and has a maximum diameter of ⅜". The elongated shaft 14 includes a tapered portion 18 which terminates in a bent tip 20 (FIGS. 2–6). The preferred height of the bent tip is approximately ½".

The slide assembly 16 includes an opening 22 therein which allows the slide assembly 16 to be slidably mounted along the elongated shaft 14 so that it can be moved closer to or further from the bent tip 20 (FIGS. 3 and 4). Furthermore, the shaft 14 is free to rotate within the opening 22. The slide assembly preferably is in the form of a block having an upper portion 24 that extends forwardly. A downwardly extending projection 26 is integrally formed with the forward end of the portion 24 but i s spaced from the main body of the block so as to form a notch or groove 28. As best shown in FIG. 4, the lowermost end of the projection 26 terminates at a distance just above the shaft 14 so as to leave a space 29 therebetween. It should be noted that the height of th e bent tip 20 is slightly greater than the height of the space 29.

The tool 10 is utilized to pry open punch-outs, shown at 30 in FIGS. 1 and 6, located in a box-like enclosure 32 which is mounted flush with a wall 34. The box-like enclosure can be a circuit breaker box, a fuse box, a meter box or the like. The box-like enclosure is comprised of sheet metal and is defined by a rear wall, a pair of opposing side walls, and top and bottom walls (FIG. 1). The free ends of the box walls are bent 90e to form a plurality of lips 44, 46, 48 and 50. The lips facilitate the attaching of a door (not shown) to the box-like enclosure. Only a minimal amount of space exists between the wall 34 and the box-like enclosure 32 (FIG. 1). Typically, no more than ½" of space exists.

When wires have to be run to or from the box-like enclosure 32, one of the concentric punch-outs 30 must be removed. In order to remove a punch-out 30, pressure must be applied to the same in order partially bend the punch-out inwardly into the interior of the box-like enclosure 32. This enables the punch-out 30 to be grasped by a pair of pliers or side cutters and be removed from the enclosure 32. It should be noted that since only a minimal amount of space exists between the enclosure 32 and the wall 34, it has heretofore been extremely difficult for an electrician to reach and apply pressure to the exterior of the enclosure 32 so that the punch-out is partially bent inwardly.

The tool 10 described above is utilized to effectively pry open punch-outs so that they are bent inwardly into the box-like enclosure 32. The tool is used in the following manner. An electrician grasps the handle member 12 and rotates it so that the bent tip 20 of the elongated shaft 14 can be inserted into the space between the wall 34 and the box-like enclosure 32. This is accomplished by positioning the bent tip 20 so that a side of the same is positioned adjacent the wall of box-like enclosure which has the punch-out 30 to be removed associated therewith (FIG. 5). The groove 28 in the slide assembly 16 is inserted over one of the elongated lips, such as 44, which extends perpendicularly from an edge of the wall of the box-like enclosure (FIGS. 1 and 5). When the tool is so inserted, part of the elongated shaft contacts the wall of the box-like enclosure.

Thereafter, the electrician rotates the handle member 12 so that the bent tip 20 pries the punch-out 30 inwardly into the interior of the box-like enclosure 32 as shown in FIG. 6. The size of the groove 28 in the slide assembly 16 allows the tool 10 to be slightly angled as the handle member 12 is rotated and the bent tip 20 contacts the punch-out 30. Accordingly, the slide assembly 16 serves as a fulcrum and the bent tip 20 serves as a cam.

The present invention may be embodied in other specific forms without departing from the spirit or essential attributes thereof and accordingly reference should be made to the appended claims rather than to the foregoing specification as indicating the scope of the invention.

What is claimed is:

1. A tool for prying open punch-outs from an electrical box comprising:

a handle member;

an elongated shaft extending outwardly from said handle member, said elongated shaft terminating in a bent tip;

fulcrum means for engaging a portion of said box, said fulcrum means being slidably and rotatably mounted to said elongated shaft, said fulcrum means including a slide assembly having an opening extending therethrough, said elongated shaft extending through said opening in said slide assembly, said slide assembly further having a groove therein for engaging a lip of said box, and said slide assembly being adapted to move closer to or further from said bent tip;

said bent tip of said elongated shaft being adapted to act as a cam in order to pry open a punch-out from said box when said fulcrum means engages said box and said handle is rotated.

2. The tool of claim 1 wherein said elongated shaft includes a tapered portion, said bent tip extending from the end of said tapered portion.

\* \* \* \* \*